Patented Oct. 28, 1930

1,779,649

UNITED STATES PATENT OFFICE

RICHARD WERNER, OF HEIDELBERG, AND ALBERT ROTHMANN, OF BERLIN-CHARLOTTENBURG, GERMANY, ASSIGNORS TO WINTHROP CHEMICAL COMPANY, INC., OF NEW YORK, N. Y., A CORPORATION OF NEW YORK

ALKALINE EARTH METAL SALTS OF ARSENOBENZENE DERIVATIVES

No Drawing. Application filed September 21, 1929, Serial No. 394,374, and in Germany September 5, 1928.

The present invention relates to alkaline earth metal salts of arsenobenzene derivatives.

We have found that alkaline earth metal salts of organic acids containing arsenic, especially the alkaline earth metal salts of arsenobenzene derivatives containing an acid group in the molecule, are well suited for healing tumors, particularly spontaneous growths, and for treating protozoa diseases. This observation is the more surprising as it is known that the corresponding alkali salts have no therapeutic action in the case of carcinoma. The salts can be applied alone or also in combination with other remedies suitable for the therapy of carcinoma. Obviously, there can be used for the preparation of the therapeutic agents only those arsenobenzene derivatives which are capable of forming stable salts by virtue of their degree of acidity.

The following examples serve to illustrate our invention, but they are not intended to limit it thereto.

1. 46 gr. of 3-ω-sulfomethylamino-3'-amino-4.4'-dihydroxyarsenobenzene (cf. U. S. Patent No. 1,024,993, dated April 30, 1912, filed in the name of Georg Korndörfer) are suspended in 300 cc. of water and the suspension is shaken with 6 gr. of calcium carbonate, whilst gently heating and passing nitrogen through the suspension. When evolution of carbon dioxide ceases the whole is filtered and the filtrate is run, while stirring, into 5–6 times its volume of alcohol. The yellowish-brown calcium salt which precipitates is filtered by suction, washed with alcohol and dried. It is readily soluble in water.

2. 32 gr. of 3.3'-ω ω'-disulfomethylamino-4.4'-dihydroxyarsenobenzene (see Journal of the American Chemical Society, 1922, Volume 44, page 2573) are dissolved in 200 cc. of water and the solution is shaken for some time with 10 gr. of calcium carbonate in an atmosphere of nitrogen. The whole is then filtered and the yellow filtrate is evaporated to dryness in a vacuum at about 40° C. while passing nitrogen or hydrogen through it. There remains as residue a brilliant yellowish-brown powder which is easily soluble in water to an aqueous solution which remains clear for a long time without darkening.

The product has the following formula:

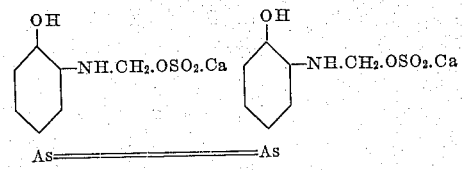

3. 32 gr. of 3.3'-ω ω'-disulfomethylamino-4.4'-dihydroxyarsenobenzene are converted into the strontium salt by means of 15 gr. of strontium carbonate in the manner described in Example 2. The product is a yellowish-brown powder which is easily soluble in water.

The barium salts can be prepared in an analogous manner as the calcium salts and the strontium salts.

Instead of the arsenobenzene derivatives stated therein there can, of course, also be used as starting material other arsenobenzene derivatives containing strongly acid groups, such as for instance di-para, para'-glycine-arsenobenzene or diformaldehyde-bisulfite-arseno-(1-phenyl-2.3-dimethyl-4-amino-5-pyrazolon).

We claim:

1. As new products, the alkaline earth metal salts of organic arsenobenzene derivatives containing at least one amino group which is substituted by a sulfomethyl residue.

2. As new products, the calcium salts of organic arseno-benzene derivatives containing at least one amino group which is substituted by a sulfomethyl residue.

3. As a new product, the calcium salt of 3.3'-ω ω'-disulfomethylamino-4.4'-dihydroxyarsenobenzene, forming a brilliant yellowish-brown powder which is easily soluble in water.

4. As a new product, the calcium salt of 3-ω-sulfomethylamino-3'-amino-4.4'-dihydroxyarsenobenzene, having a yellowish brown color and being readily soluble in water.

In testimony whereof, we affix our signatures.

PROF. DR. RICHARD WERNER.
ALBERT ROTHMANN.